2,903,693

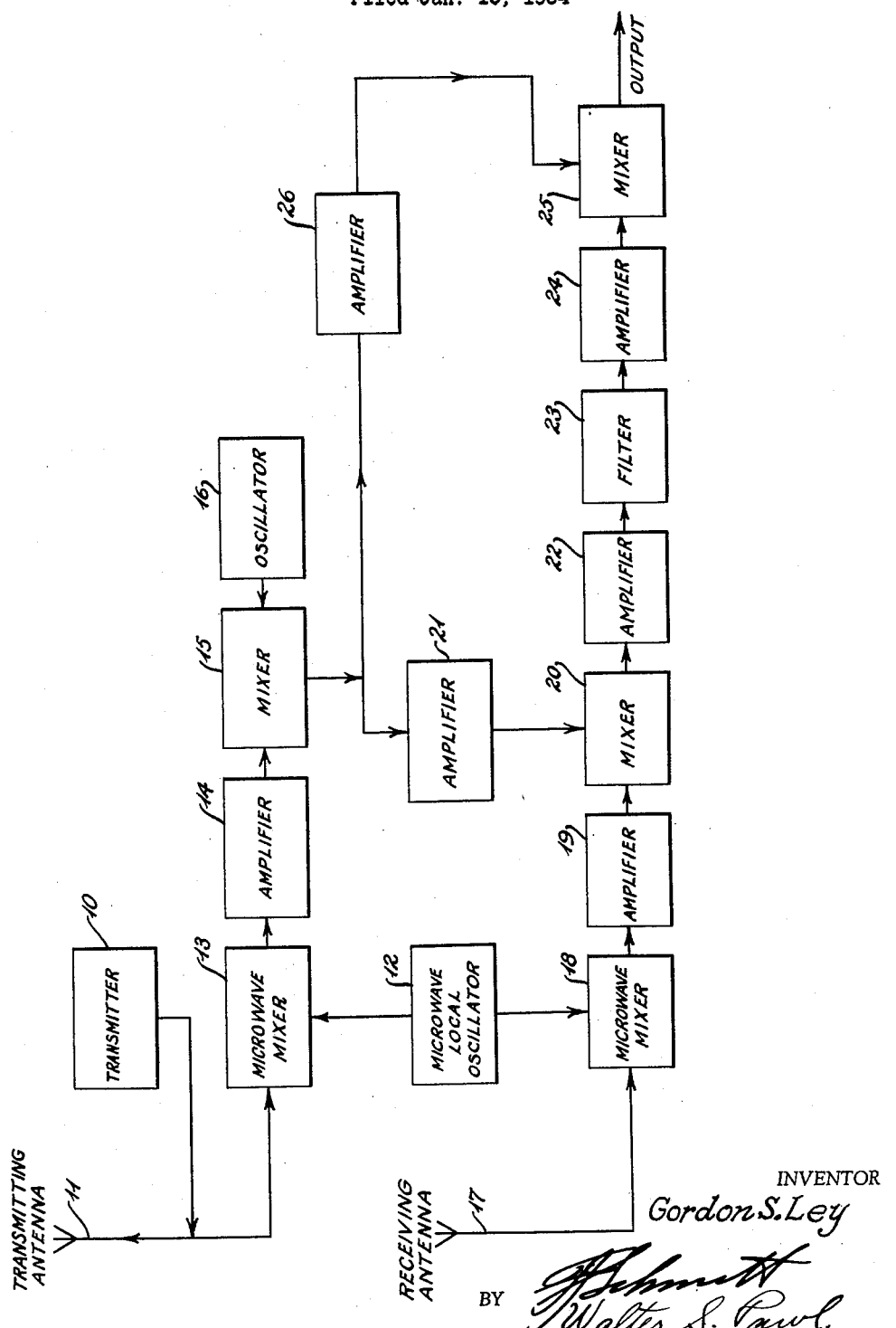

FREQUENCY MODULATION FILTER

Gordon S. Ley, Plainfield, N.J., assignor, by mesne assignments, to the United States of America as represented by the Secretary of the Navy Application January 13, 1954, Serial No. 403,940

5 Claims. (Cl. 343—14)

This invention relates to a system for the elimination of a signal with known frequency modulation from a group of differently modulated waves. More specifically, it relates to the elimination of leak-through in a continuous wave frequency modulated radar set.

In a continuous wave frequency modulated radar system which is used for detecting a moving target, the frequency of the transmitted wave is periodically and continuously changed over a predetermined band. The frequency of the energy being transmited by the antenna differs from the frequency of the energy being received from the moving target because of the time required for the energy to reach the target and return to the receiver. Since the frequency difference depends on the distance travelled, it can be used as a measure of range.

In present radar systems there is a certain amount of leak-through between the transmitter and receiver of the radar set which results in the transmitted signal affecting the characteristics of the received signal and thereby detracting from the accuracy of the measurement of the received signal. At the present time, this undesirable leak-through, having a specific frequency modulation, is separated from the desirable frequency modulated signal by heterodyning the total signal including the desired and undesired signal with a voltage having the same modulation as the desired signal. The heterodyned output then has the desired signal with no frequency modulation and the undesired signal with frequency modulation. The resulting signal is then passed through a band pass filter to eliminate the energy of the undesired signal. However, in this situation the filter must be broad enough to pass the first sidebands of the desired signal in order to lock up the range circuit of the radar receiver. The carrier and the first sidebands of the undesired signal are reduced below the undeviated carrier level by an amount which is approximately the square root of the frequency modulation index. However, a satisfactory lock up requires that the sidebands be within a specified level below that of the undeviated carrier for that signal, which level is not satisfactorily attained by the use of the aforementioned system. Thus in order to obtain a satisfactory signal the effective discrimination against the undesired signal is only effective within a relatively small range. Furthermore, the leak-through signal may be within a sufficiently great range above a target signal to prevent proper radar operation. Thus it can be seen that the principal undesired signal in a continuous wave radar system is the unwanted coupling, or leak-through, between the receiving and transmitting antennas and the prior art does not satisfactorily eliminate it.

The present invention, instead of passing the desired signal through a band pass filter which also passes some undesired signals, heterodynes the total signal with a voltage which is frequency modulated the same as the undesired signal. The heterodyned output will then have an undesired signal with no frequency modulation and a desired signal with frequency modulation. This combination is passed through a narrow reject band filter and thus the undesired signal is eliminated in toto whereas only the carrier and the first sidebands out of typically one hundred pairs of sidebands are eliminated in the desired signal. Thus the desired signal is virtually unimpaired and the undesired signal is eliminated. The resulting signal is then again heterodyned with the same voltage frequency modulated like the undesired signal and the total signal is restored to its original condition except that the undesired signal is eliminated.

It is therefore one object of the present invention to provide a system for the elimination of a signal with known frequency modulation from a group of differently modulated waves.

It is another object of this invention to provide a system for the elimination of unwanted coupling between the receiving and transmitting antennas of a continuous wave radar set.

Other objects and many of the attendant advantages of this invention will be readily appreciated as the same becomes better understood by reference to the following detailed description when considered in connection with the accompanying drawing which illustrates a preferred embodiment of the invention in block diagram form.

In the drawing there is shown a transmitter 10 for transmitting a continuous wave frequency modulated signal to antenna 11. In the radar system the undesired signal, or leak-through, has such a short path that its frequency modulation is the same as that of the transmitter. A heterodyning voltage is obtained by mixing a small portion of the transmitter signal from transmitter 10 with the output of the radar microwave local oscillator 12 in microwave mixer 13. This voltage is then amplified by amplifier 14 and mixed in mixer 15 with the output of oscillator 16. The output voltage from mixer 15 is the heterodyning voltage.

The received signal is picked up by antenna 17, and this signal is mixed in microwave mixer 18 with the output of microwave local oscillator 12. The output of mixer 18 is amplified by amplifier 19 and fed to mixer 20. The heterodyning voltage from mixer 15 is amplified by amplifier 21 and is also fed to mixer 20 where the heterodyning signal is mixed with the received signal. The output of mixer 20, which includes the leak-through signal stripped of its frequency modulation component, is then fed to amplifier 22, and is then filtered in the narrow reject band filter 23. The output of filter 23 is therefore freed of leak-through signal. The output of filter 23 is then amplified by amplifier 24 and fed to mixer 25. The heterodyning voltage from mixer 15 is amplified by amplifier 26 and is also fed to mixer 25. Thus the received signals which have been freed of leak-through signals are mixed in mixer 25 with the heterodyning voltage from mixer 15. The resulting output signal from mixer 25 is like the signal at amplifier 19 except that the leak-through has been eliminated.

It is to be noted at this point that an alternative system which comprises frequency modulating filter 23 to follow the undesired signal would achieve the same results as mentioned above, but when used in an application such as set forth above, would be more difficult to design and to keep exactly following the undesired modulation.

The apparatus for carrying out the present invention may be incorporated into existing continuous wave frequently modulated radar systems and would require only the addition of amplifiers 22, 24 and 26, filter 23 and mixers 20 and 25. These additional elements are integrated into existing equipment as shown in the accompanying drawing and as described in the accompanying specification. Obviously many modifications and variations of the present invention are possible in the light of the above teachings. It is therefore to be understood that within the scope of the appended claims the inven-

Having thus described my invention I claim:

1. A system for elimination of an undesirable signal with known frequency modulation from a total signal containing said undesirable signal comprising first means for heterodyning said total signal with a signal which is frequency modulated the same as the undesirable signal to remove the frequency modulation of the undesirable signal, filtering means for filtering said signal to remove the undesirable signal, and second means for heterodyning said signal with the same signal frequency modulated like the undesirable signal to restore the total signal to its original condition except for the elimination of the undesirable signal.

2. A system for the elimination of an undesirable signal with known frequency modulation from a total signal containing said undesirable signal comprising first means for producing a heterodyning signal which is frequency modulated the same as the undesirable signal, first mixing means coupled to said first means for mixing said total signal with said heterodyning signal to remove the frequency modulation of the undesirable signal, filtering means coupled to said first mixing means to remove said undesirable signal, and second mixing means coupled to said filtering means and to said first means to restore the signal to its original condition except for the elimination of the undesirable signal.

3. A system for the elimination of unwanted coupling between the transmitted and received signals of a continuous wave frequency modulated radar set comprising first means for producing a heterodyning signal having the same frequency modulation as the transmitted signal, first mixing means coupled to said first means for mixing the heterodyning signal with the received signal to remove the frequency modulation of the transmitted signal which appears in the received signal, filtering means coupled to said first mixing means to remove said transmitted signal, and second mixing means coupled to said filtering means and to said first means to restore the received signal to its original condition except for the elimination of the transmitted signal.

4. In a frequency modulated continuous wave radar set having a transmitter for transmitting a signal and a receiver for receiving a signal, means for eliminating unwanted coupling between said transmitter and receiver comprising first means coupled to said transmitter for producing a heterodyning signal having the same frequency modulation as the signal transmitted by said transmitter, first mixing means coupled to said receiver and to said first means for mixing the received signal with the heterodyning signal to remove the frequency modulation of the transmitted signal which appears in the received signal, a narrow reject band filter coupled to said first mixing means to remove said transmitted signal, second mixing means coupled to said filter and to said first means to restore the received signal to its original condition except for the elimination of the transmitted signal.

5. A system for the elimination of an undesired signal with known frequency modulation from a total signal containing a desired signal and the undesired signal comprising means for producing a known signal which is frequency modulated the same as the desired signal, first combining means for combining said total signal and said known signal to produce an output comprising the desired signal with frequency modulation and the undesired signal with no frequency modulation, reject means connected to said first combining means for producing a reject signal in which the undesired signal is eliminated in toto, and second combining means connected to said reject means for combining said reject signal and said known signal whereby the total signal is essentially restored except for the elimination of the undesired signal.

References Cited in the file of this patent

UNITED STATES PATENTS

| | | |
|---|---|---|
| 2,475,176 | Yuan | July 5, 1949 |
| 2,510,906 | Reid | June 6, 1950 |
| 2,518,864 | Carlson | Aug. 15, 1950 |
| 2,525,328 | Wolff | Oct. 10, 1950 |
| 2,537,596 | Martinelli | Jan. 9, 1951 |
| 2,537,597 | Martinelli | Jan. 9, 1951 |
| 2,576,157 | Tykulsky | Nov. 27, 1951 |
| 2,692,330 | Kahn | Oct. 19, 1954 |